US012604381B2

(12) United States Patent
Mahajan et al.

(10) Patent No.: US 12,604,381 B2
(45) Date of Patent: Apr. 14, 2026

(54) BOOST-BASED POWER FACTOR CORRECTION WITH CLOSED-LOOP CONTROL

(71) Applicant: Honeywell International Inc., Charlotte, NC (US)

(72) Inventors: Deepak B. Mahajan, Bengaluru (IN); Abhijit Kulkarni, Bengaluru (IN); Ritu Rai, Bengaluru (IN); Nipun Kumar Chawda, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 122 days.

(21) Appl. No.: 18/441,799

(22) Filed: Feb. 14, 2024

(65) Prior Publication Data

US 2025/0261292 A1    Aug. 14, 2025

(51) Int. Cl.
*H05B 45/355* (2020.01)
*H02M 1/42* (2007.01)
*H05B 45/3725* (2020.01)

(52) U.S. Cl.
CPC ........ *H05B 45/355* (2020.01); *H02M 1/4225* (2013.01); *H05B 45/3725* (2020.01)

(58) Field of Classification Search
CPC .............. H05B 45/355; H05B 45/3725; H05B 45/37–385; H02M 1/4225
See application file for complete search history.

(56) References Cited

U.S. PATENT DOCUMENTS

| | | | | |
|---|---|---|---|---|
| 9,190,901 | B2 | 11/2015 | Gumaer | |
| 9,214,855 | B2 | 12/2015 | Gumaer | |
| 11,729,883 | B1* | 8/2023 | Xiong | H05B 45/385 |
| | | | | 315/219 |
| 2005/0030192 | A1 | 2/2005 | Weaver | |
| 2010/0102737 | A1* | 4/2010 | Facchini | H05B 45/382 |
| | | | | 315/210 |
| 2014/0028214 | A1* | 1/2014 | Mazumdar | H05B 45/38 |
| | | | | 315/279 |

(Continued)

FOREIGN PATENT DOCUMENTS

| | | | | |
|---|---|---|---|---|
| EP | 4123893 | A1 * | 1/2023 | .......... H02M 3/1584 |
| JP | 5871134 | B2 * | 3/2016 | ............. H05B 45/10 |

OTHER PUBLICATIONS

Translation of JP-5871134-B2 (Year: 2016).*

*Primary Examiner* — Renan Luque
(74) *Attorney, Agent, or Firm* — Brooks, Cameron & Huebsch, PLLC

(57) ABSTRACT

Boost-based power factor correction with closed-loop control is described herein. Some embodiments include a current-source fed power factor correction circuit, comprising a current transformer configured to step down a current from a current source, a diode bridge rectifier connected to the current transformer, a capacitor connected to an output of the diode bridge rectifier, a boost converter having a start-up diode and connected to the capacitor, a direct current (DC)-DC converter connected to an output of the boost converter and configured to regulate an operation of a light-emitting diode (LED), a voltage sensor configured to determine output voltage, and a current sensor configured to determine a current associated with the diode bridge rectifier.

19 Claims, 2 Drawing Sheets

(56)             References Cited

U.S. PATENT DOCUMENTS

2014/0077974 A1*  3/2014  Niino ................... H05B 45/382
                                              340/953
2015/0303823 A1*  10/2015  Itoh ..................... H05B 45/382
                                              363/89
2016/0073455 A1*  3/2016  Takacs ................... H05B 45/10
                                              315/297
2016/0081171 A1*  3/2016  Ichikawa ............... H05B 47/25
                                              315/77
2021/0345465 A1*  11/2021  Huang ................. H05B 45/382
2024/0128875 A1*  4/2024  Bonavente .......... H02M 1/0009

* cited by examiner

BOOST-BASED POWER FACTOR CORRECTION WITH CLOSED-LOOP CONTROL

TECHNICAL FIELD

The present disclosure relates to methods, devices, and systems for boost-based power factor correction with closed-loop control.

BACKGROUND

Airfields can include lighting systems to provide airfield illumination, visual cues, and/or signals for an airfield. Airfield lighting systems, among other systems, may use a current source input instead of a conventional alternating current (AC) voltage source.

DETAILED DESCRIPTION

Figure 1:
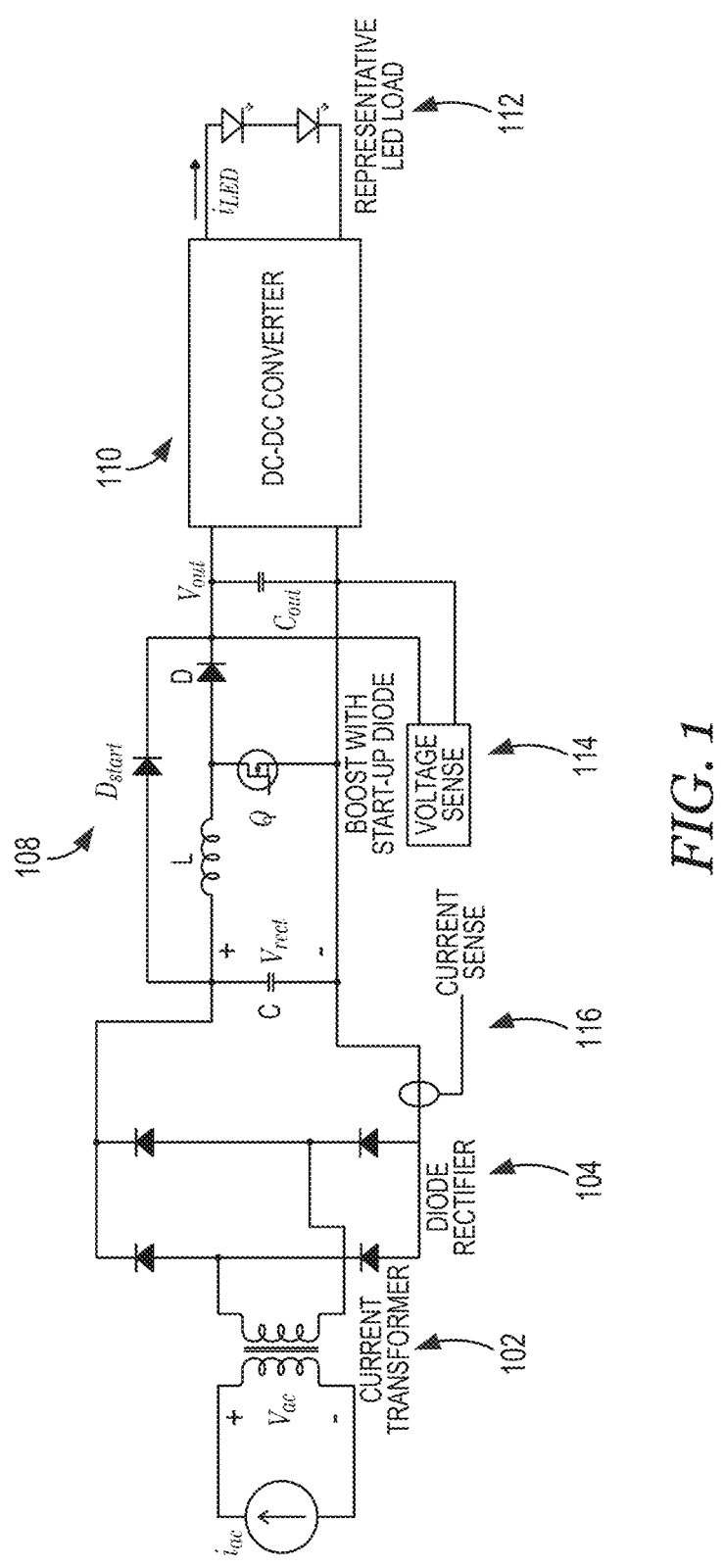
FIG. 1 is a diagram of a circuit topology, in accordance with one or more embodiments of the present disclosure.

Boost-based power factor correction with closed-loop control is described herein. An example embodiment includes a current-source fed power factor correction circuit, comprising a current transformer configured to step down a current from a current source, a diode bridge rectifier connected to the current transformer, a capacitor connected to an output of the diode bridge rectifier, a boost converter having a start-up diode and connected to the capacitor, a direct current (DC)-DC converter connected to an output of the boost converter and configured to regulate an operation of a light-emitting diode (LED), a voltage sensor configured to determine output voltage, and a current sensor configured to determine a current associated with the diode bridge rectifier.

Airfield lights can be located in, above, and/or around an airport surface. As used herein, the term "airfield light" refers to a lighting unit including a light source and asso-ciated wiring. For example, airfield lights can include halo-gen and/or light emitting diode (LED) lamps and can be located around approach ways, mounted in the airport sur-face on runways, taxiways, intersections, etc. An airfield light can be installed within the pavement surface of the surface of the airfield. Inset airfield lights can provide guidance for aircraft during takeoff, landing, and ground movement (e.g., taxiing). The airfield lights can define the edges and/or a centerline of runways and/or taxiways, help pilots identify locations on the airfield, and/or give pilots directional information. Accordingly, airfield lights can help pilots safely navigate the airfield, especially during night-time and/or during low visibility conditions.

Existing airfield lighting products are typically either halogen-based (e.g., with power ratings of up to 600 W) or LED based (e.g., with power ratings of 30 W or less). However, higher power LED lights are available. For instance, some LEDs may have a power rating of 70-80 W, which is more than double the power rating of the existing LED-based lights. As the power rating increases, it is desirable to have good power factor and harmonic control. This is to meet the standards such as IEC 61000-3.2 and to provide benefits to the power converter as well in terms of higher efficiency and reliability. A reliable PFC topology and control in accordance with embodiments of the present disclosure provides improved efficiency and longer operat-ing life.

While the present disclosure makes reference to the specific example of airfield lights, it is noted that embodi-ments herein are not so limited. Embodiments of the present disclosure include boost-based power factor correction (PFC) with closed-loop control for any suitable load and/or application.

Conventional voltage source fed alternating current (AC) to direct current (DC) rectification with PFC provides advantages in terms of reduction in the power consumption from the source, reduced distortions in the source voltage due to sinusoidal current drawn, and extended equipment life due to reduced power loss and reduced electrical stresses for the components. PFC can be achieved using different power circuit topologies such as a diode bridge rectifier followed by boost converter/single-ended primary-inductor converter (SEPIC) converter, active rectifiers with output voltage and input current control, etc. A boost converter-based PFC is a popular low-cost topology, which is typically implemented using a two-loop control: outer DC voltage control and inner current loop with wave shaping.

In some applications, the AC source is a current source instead of a conventional AC voltage source. Airfield light-ing systems come under this category and use current source input to illuminate the airfield. The PFC for such a system can involve control of a rectifier to ensure that the current source sees a sinusoidal voltage at its terminals with unity power factor, which will offer the same advantages of reduced power consumption, reduced current distortion and reduced component stresses. Airfield lighting loads are typically connected in series and fed by a current source. Hence, to have good dynamic response, they are controlled to emulate resistive behavior. PFC can achieve this while reducing harmonic distortion. Low harmonic distortion is preferred as it has lower interference in the power line communication used by the airfield infrastructure for remote control and monitoring of the lights. Light-emitting diodes (LEDs) may be used as the light sources for airfields and involve the conversion of AC to DC with a regulation in the LED current irrespective of the variations in the current source.

Embodiments of the present disclosure include a boost-based PFC topology with closed-loop control. The closed loop control does not require AC voltage sensing and works efficiently with output DC voltage sensing. Compared to previous approaches, the embodiments herein provide a number of advantages and/or features. For example, embodiments herein provide sinusoidal or low distortion input voltage for a wide variation of the input current. Embodiments herein provide a reliable start-up method. Embodiments herein provide analog implementation of single-loop control with voltage control and improved dynamic response. Embodiments herein provide dynamic response across all the operating conditions. Embodiments herein provide LED start-up without any flickering. Embodiments herein do not require large AC capacitors or AC side current sensing.

Some previous approaches to airfield lighting use digital processor-based control of lighting. In contrast, embodi-ments herein utilize an analog implementation. This offers advantages of lower hardware cost. The digital processor-based approach additionally requires the software to be certified based on applicable standards. Other previous approaches use a bridgeless boost PFC to achieve sinusoidal voltage at the input of the PFC. This type of topology is undesirably complex in the analog control implementation due to phase-shifted control of the active devices.

Other previous approaches use an AC capacitor at the input of the current source, whose charging and discharging is controlled via the boost PFC topology to achieve a sinusoidal waveform. The AC capacitors tend to be bulky in size. Embodiments herein avoid the use of an input AC side capacitor and use a lower size/low capacitance ceramic capacitor at the DC side. While these previous approaches sense the AC current directly, which is used in the closed-loop control, embodiments herein use unidirectional current sense by placing the sensor at the output side of the diode bridge rectifier. Another salient difference of embodiments described herein is the use of a low frequency transformer at the input side, which assists in stabilizing the current source response and providing additional attenuation to the switching frequency harmonics that may be seen at the current source. Unlike previous approaches, embodiments herein use a diode to accelerate the start-up of the circuit.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is a diagram of a circuit topology 100, in accordance with one or more embodiments of the present disclosure. The topology 100 uses an input current transformer (CT) 102 that steps down the current. This is followed by a passive diode bridge rectifier (DBR) 104. A capacitor (e.g., ceramic capacitor) C 106 of low value is connected to the output of the DBR. The terminals of the capacitor C are connected to a boost converter with a startup diode D$_{start}$ 108. The output of the boost feeds a DC-DC converter (e.g., a buck converter) 110 which controls the current in the LED(s). A representative LED load 112 is shown in FIG. 1 at the output. The topology 100 illustrated in FIG. 1 uses two sensors. For instance, the topology 100 can include an output voltage sensor 114, which can be a simple resistor divider network. The topology 100 can include a current sensor 116 at the rectified stage. The current sensor 116 can be a simple resistor shunt, hall effect based current sensor, etc. The input CT 102, capacitor C 106 and boost inductor 117 act as a latching current limiter (LCL) filter to attenuate switching harmonic voltages that may appear at the current source.

The topology 100 ensures that in the steady state the voltage V$_{rect}$ is a rectified sine wave by properly controlled off-time of the boost switch Q 118. The off-time duty ratio (d') is a function of the total output power P, input rms current i$_{rms}$, desired output voltage V$_{out}$, CT turns ratio k$_{ct}$ and efficiency η as in the equation below:

$$d' = \frac{\sqrt{2}\,P}{\eta k_{ct} i_{rms} V_o} |\sin(\omega t)|$$

The closed-loop control design, described further below, ensures that the duty ratio reaches the above value in steady state to track the output voltage to the desired level of V$_{out}$ for any given condition of output power and input current. Note that ω corresponds to the frequency in rad/s for the current source input, for example ω=2π×50 rad/s.

Embodiments herein use a single-loop control design to regulate the boost output voltage to a known value V$_{out}$. Embodiments herein may use single-loop control because the current source makes the boost inductor current a constant low frequency input instead of a state variable. Thus, the output voltage dynamics depend on (e.g., depend only on) the effective load seen by the boost converter and the output capacitance C$_{out}$. Since the inductor current is not a state variable, it is only used to vary the duty ratio of the boost switch Q 118 to ensure rectified sine-wave voltage at C 106. The overall closed-loop control diagram is described below in connection with FIG. 2.

Figure 2:
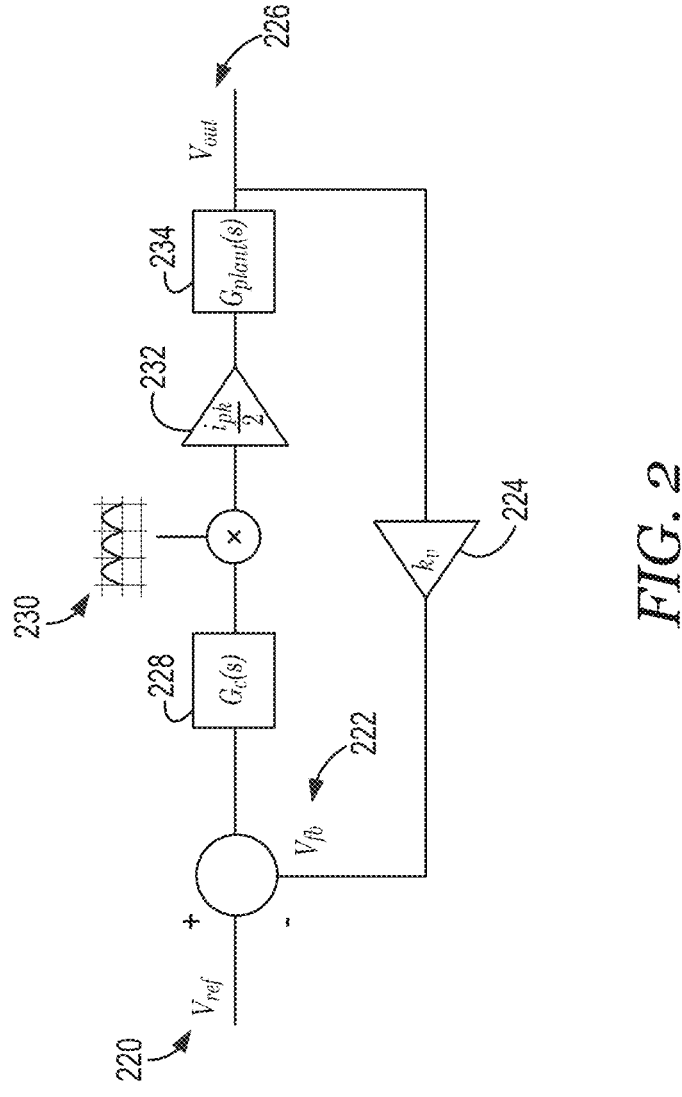
FIG. 2 is a block diagram illustrating a closed-loop control circuit, in accordance with one or more embodiments of the present disclosure.

FIG. 2 is a block diagram illustrating a closed-loop control circuit, in accordance with one or more embodiments of the present disclosure. A reference voltage V$_{ref}$ 220 is compared with the feedback voltage V$_{fb}$ 222 from the resistor divider network, previously described in connection with FIG. 1. The gain k$_v$ 224 is the reduction factor between the actual output voltage 226 and the feedback voltage 222. That is, $$k_v = \frac{V_{fb}}{V_{out}}$$

The controller has the following transfer function:

$$G_c(s) = \frac{1 + s\tau_2}{s\tau_1(1 + s\tau_3)}$$

The output of the controller G$_c$(s) 228 is multiplied by a rectified sine waveform 230, derived from the sensed rectified current. The multiplier can be implemented in analog circuitry using available multiplier integrated circuits or using opamp based multipliers. This signal gets scaled by half of the peak current i$_{pk}$/2 232 as shown in FIG. 2. This goes into the plant transfer function 234 to generate the output voltage $V_{out}$. The plant transfer function 234 is given below. Here, R is the effective resistance seen by the boost converter.

$$G_{plant}(s) = \frac{R}{1 + sRC_{out}}$$

Using the above plant transfer function 234, voltage sense gain 224 and current amplitude, the controller parameters $\tau_1$, $\tau_2$, and $\tau_3$ can be determined using the standard control design techniques for continuous time systems. This model provides an accurate way to design the closed-loop control of the converter to get a critically damped response, without the need to go for trial-and-error approaches.

Referring back to FIG. 1, a start-up sequence in accordance with embodiments of the present disclosure can begin with all capacitors completely discharged. Analog electronics cannot work initially as desired due to unavailability of bias voltages (e.g., 5V, 3.3V, or 15V) supplying analog circuit blocks such as opamps, current sensors, gate drivers, etc. Thus, when the circuit connects to the current source, the boost switch Q 118 is OFF. Since the output capacitance is considerably larger than the capacitor C 106, the rectified current from the current source starts to charge the output capacitor via the start-up diode $D_{start}$. Once the voltage builds up to sufficient value (e.g., 5V), the analog circuitry starts functioning including the boost switch Q 118. As the output voltage is still lower than the desired voltage, the closed-loop control takes over and ensures the tracking of the reference voltage $V_{ref}$ 220. The LED load 112 is enabled only after the boost voltage reaches a voltage above the LED string voltage to ensure the decoupling between the dynamics of the boost converter with the following DC-DC converter stage. This approach ensures smooth start-up of LEDs without any flickering due to insufficient start-up voltage.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A current-source fed power factor correction circuit, comprising:
    a current transformer configured to step down a current from a current source;
    a diode bridge rectifier connected to the current transformer;
    a capacitor connected to an output of the diode bridge rectifier;
    a boost converter having a start-up diode and connected to the capacitor;
    a direct current (DC)-DC converter connected to an output of the boost converter and configured to regulate an operation of a light-emitting diode (LED);
    a voltage sensor configured to determine output voltage; and
    a current sensor configured to determine a current associated with the diode bridge rectifier, wherein the current transformer, the capacitor, and a boost inductor of the boost converter act as a latching current limiter (LCL) filter.

2. The circuit of claim 1, wherein the output voltage activates a plurality of LEDs.

3. The circuit of claim 2, wherein the plurality of LEDs are airport runway lights or airport taxiway lights.

4. The circuit of claim 1, wherein an off-time duty ratio of the circuit is given by:

$$d' = \frac{\sqrt{2}\,P}{\eta k_{ct} i_{rms} V_o} |\sin(\omega t)|,$$

wherein:
    P is a total output power;
    $i_{rms}$ is an input rms current;
    $V_o$ is a desired output voltage;
    $K_{ct}$ is a turns ratio of the current transformer; $\eta$ is efficiency; and
    $\omega$ corresponds to a frequency of the current source.

5. The circuit of claim 1, wherein the voltage sensor is a resistor divider network.

6. The circuit of claim 1, wherein the capacitor is a ceramic capacitor.

7. The circuit of claim 1, wherein the current source is a phase-cut current source.

8. The circuit of claim 1, wherein the LCL filter is configured to attenuate switching harmonic voltages appearing at the current source.

9. The circuit of claim 1, wherein the circuit comprises exclusively analog components.

10. A system, comprising:
    a plurality of light-emitting diodes (LEDs); and
    a current-source fed power factor correction circuit, comprising:
        a current transformer configured to step down a current from a current source;
        a diode bridge rectifier connected to the current transformer;
        a capacitor connected to an output of the diode bridge rectifier;
        a boost converter having a start-up diode and connected to the capacitor;

a direct current (DC)-DC converter connected to an output of the boost converter and configured to regulate an operation of the plurality of LEDs;

a voltage sensor configured to determine output voltage; and a current sensor configured to determine a current associated with the diode bridge rectifier, wherein the current transformer, the capacitor, and a boost inductor of the boost converter act as a latching current limiter (LCL) filter.

11. The system of claim 10, wherein the plurality of LEDs are airport runway lights.

12. The system of claim 10, wherein the plurality of LEDs are airport taxiway lights.

13. The system of claim 10, wherein each of the plurality of LEDs has a power rating exceeding 70 watts.

14. A method, comprising:

connecting a circuit to a current source, the circuit comprising:

a current transformer configured to step down a current from the current source;

a diode bridge rectifier connected to the current transformer;

a capacitor connected to an output of the diode bridge rectifier;

a boost converter having a start-up diode and connected to the capacitor;

a direct current (DC)-DC converter connected to an output of the boost converter and configured to regulate an operation of a string of light-emitting diodes (LEDs);

a voltage sensor configured to determine output voltage; and a current sensor configured to determine a current associated with the diode bridge rectifier, wherein the current transformer, the capacitor, and a boost inductor of the boost converter act as a latching current limiter (LCL) filter;

charging the capacitor via the start-up diode;

activating the string of LEDs responsive to a boost output voltage exceeding a string voltage associated with the string of LEDs.

15. The method of claim 14, wherein the method includes regulating the boost output voltage to a known value.

16. The method of claim 14, wherein the circuit comprises exclusively analog components.

17. The method of claim 14, wherein the method includes tracking a reference voltage.

18. The method of claim 17, wherein the method includes comparing the reference voltage with a feedback voltage determined by the voltage sensor.

19. The method of claim 18, wherein the method includes determining a gain based on the output voltage and the feedback voltage.

* * * * *